United States Patent [19]
Ernst

[11] Patent Number: 5,611,830
[45] Date of Patent: Mar. 18, 1997

[54] AIR FILTER HAVING POCKETS, AND METHOD OF ASSEMBLY THEREOF

[75] Inventor: Beat Ernst, Wettingen, Switzerland

[73] Assignee: Zenteco AG, Wettingen, Switzerland

[21] Appl. No.: 494,443

[22] Filed: Jun. 26, 1995

[30] Foreign Application Priority Data

Jul. 4, 1994 [CH] Switzerland ............... 02124/94

[51] Int. Cl.$^6$ .................................. B01D 46/02
[52] U.S. Cl. .................................. 55/378
[58] Field of Search .................................. 55/378

[56] References Cited

U.S. PATENT DOCUMENTS

| 3,138,443 | 6/1964 | Engle et al. | |
| 3,541,767 | 11/1970 | Getzin et al. | 55/378 |
| 3,834,134 | 9/1974 | McAllister | 55/378 |
| 3,844,749 | 10/1974 | Carter, Sr. | 55/378 |
| 4,193,780 | 3/1980 | Cotton, Jr. et al. | |
| 5,320,655 | 6/1994 | Ernst | 55/378 |

FOREIGN PATENT DOCUMENTS

| 2449330 | 4/1976 | Germany. | |
| 8122276 | 10/1981 | Germany. | |
| 8308859 | 7/1983 | Germany. | |
| 1494937 | 7/1989 | U.S.S.R. | 55/378 |

Primary Examiner—Tim R. Miles
Attorney, Agent, or Firm—Frishauf, Holtz, Goodman, Langer & Chick, P.C.

[57] ABSTRACT

The filter, typically an air cleaning filter, has a frame element, preferably rectangular or square, retaining a plurality of adjacently located filter bags (4). The filter bags, themselves, are retained in the frame by bag-supporting ribs (6) which are folded from blanks (11, 11') in zig-zag fashion to define a central folded part 9, and two lateral folded portions (10, 10"10). To assemble the filter, adjacent filter bags are inserted and then clamped between the central portion and a lateral folded portion, and held together for example by adhesives, staples, or the like. The ends of the rib structures (6) define support legs (12, 12") which are secured to the frame element (1). The position of the ribs (6) determines the spacing of the filter bags (4). A spacing comb (14) formed with slits (16) determines the spacing between the opening of adjacent filter bags. The structure permits easy matching of filter bags to different dimensions of frame elements. Preferably, all materials used, frame element (1), filter bags (4) and ribs (6), are made of combustible material, for example paper and cardboard, or the like, so that the filter, including contents, can be incinerated as a unit.

14 Claims, 5 Drawing Sheets

AIR FILTER HAVING POCKETS, AND METHOD OF ASSEMBLY THEREOF

Reference to related patent and application, assigned to the assignee of the present application, the disclosures of which are hereby incorporated by reference: U.S. Pat. No. 5,320,655, Ernst U.S. Ser. No. 08/394,636, filed Feb. 27, 1995, issued as U.S. Pat. No. 5,505,755 Ernst. Reference to related publication:

German 24 49 330 A.

FIELD OF THE INVENTION

The present invention relates to a filter for gaseous fluids, particularly an air filter, in which a plurality of filter bags or pockets are located next to each other to receive the flow of gas, typically air, secured to relatively parallel holding ribs, and to a method to assemble filter bags or pockets in an array in a filter frame. The holding ribs are supported on a frame.

BACKGROUND

German Published Application 24 49 330 A describes an air filter with filter bags in which the filter bags are hung on round rods, open towards the inflow of air. The portions of the filter which extend above the rods are sewn together. Constructing such an array of filter bags is comparatively expensive.

THE INVENTION

It is an object to provide an air filter which can be made inexpensively and which permits wide selection of the relative spacing of the filter bags on the holding ribs or rails with respect to dimensions of existing filtration systems, and which preferably also permit fast mechanized or automated mounting of an array of filter bags.

Briefly, the filter bags are retained in bag-supporting strips which are made in the form of folded rib structures, the ends of which are secured in the frame. The rib structures are folded from a blank in zig-zag form and secured, upright, to the frame. The material of the filter bags or pockets, which of course is gas, and, typically, air-permeable, of adjacent filter bags or filter pockets is retained between the folds of the zig-zag folded rib structures.

This arrangement permits making the holding ribs of relatively thin-wall, and hence light material. Due to the folded structure, they have a high resistance against bendthrough in the direction of the gas flow. It is also readily possible to match the spacing of the holding ribs in the frames, and the filter bags on the ribs to existing frame sizes. Preferably, and if the frame as well as the filter bags are made of combustible materials, the ribs, likewise, can be made of combustible material so that the entire filter, without separating the filter bags or pockets from the frame, can be incinerated in a suitable incineration plant.

DRAWINGS

FIG. 4 is a section along line IV—IV of FIG. 5 of the holding rib after a first folding operation;

FIG. 6 is a cross section through the rib on line VI—VI of FIG. 7 after a second folding operation.

DETAILED DESCRIPTION

Commercial filters for a gaseous medium, hereinafter for short air filters, are used to separate dust or other contaminating particles from air, or any other flowing gaseous medium. The air filter is retained, customarily, in a rectangular or square frame 1 (FIGS. 1, 2 having an attachment surface 1'. Filter bags 4 are secured to the frame 1 plurality of such filters can be combined together to form a filter array.

Figure 1:
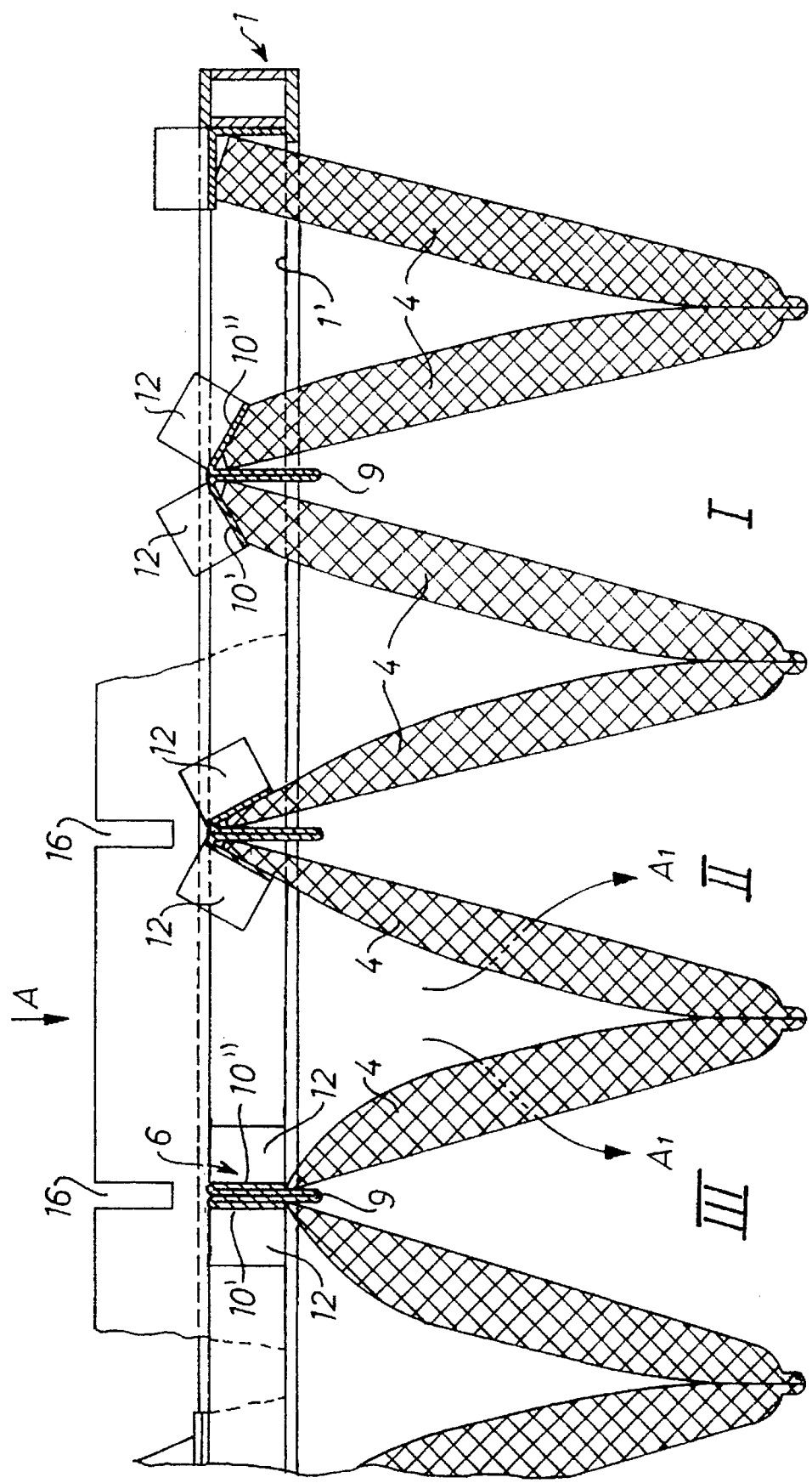
FIG. 1 is a highly schematic vertical cross-sectional view through an air filter and illustrating sequential steps in attachment of filter bags in the holding ribs, for example as they are being carried out in an automatic manufacturing system.

The frame 1, preferably, is made of adhesively connected cardboard pieces having a core of corrugated cardboard. The core has been omitted from FIGS. 1 and 2 to simplify the drawing. The cross section of the core, preferably, is rectangular, or square. The inside of the frame, usually, has an engagement stop or shoulder 2. Filter bags 4 are secured to the frame 1 by holding ribs 6. The filter bags 4 are open to the air flow, so that air can flow in the direction of the arrow A (FIGS. 1, 2) into the filter bags, penetrate the filter bags and, after having been cleaned, leave the filter bags 4 in the direction of the arrow A1 (FIG. 1). Usually, the filter bags, in cross section, are essentially V-shaped.

The holding ribs 6 are made of a continuous, relatively thin material which, preferably, is combustible, for example cardboard.

Referring now to FIGS. 3 to 7:

A flat blank 11 is folded to form the folded ribs 6. In a first folding step, the blank 11 is folded at its center portion 9 along crease line 8, thus forming the half portions 9', 9"; the outer portions 10'10" are folded or creased by 90° along crease lines 10a, 10b to form the structure shown in FIGS. 4 and 5. The two lateral legs 10', 10" initially, extend at right angles to the center portion 9. The two end flaps 12', 12" are bent 90° upwardly along crease lines 12a, 12b, with respect to the plane formed by the legs 10', 10". In a succeeding folding step, the two legs 10', 10", are folded, respectively, along crease lines 10a, 10b in the direction of the arrows C (FIG. 4) against the center portion 9. The material of the filter bag is retained between the outer portions 10', 10" and the center portion 9. This is clearly seen in the view of FIG. 1, in which the various folding steps are illustrated in sequence, with filter material being inserted (step I), grasped and initially pinched (step II), and finally clamped (step III) between the zig-zag folds 10', 9, 10". The flaps 12 become re-oriented, as the folding proceeds from the flat blank to steps I, II and III.

Figure 7:
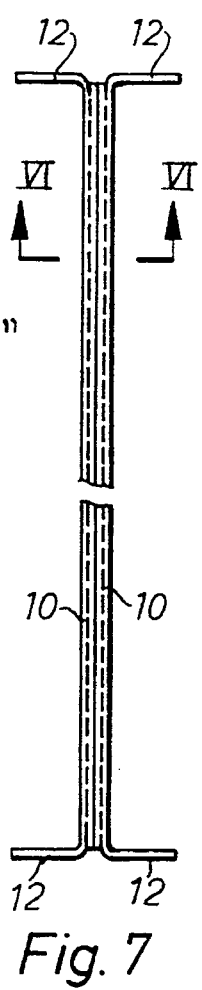
FIG. 7 is a top view of the finished folded rib.

Movement of the legs 10', 10" causes the flaps 12' (FIGS. 3, 4, 5) to form laterally extending support legs 12, as best seen in FIGS. 6 and 7. These support legs 12 are integral parts of the folding ribs 6 and engage against the inside of the frame 1, extending from the center portion 9 of the respective ribs 6 in opposite directions. The center portion 9, as seen in FIG. 6, is somewhat longer than the lateral portions 10', 10"

The filter bags 4 are clamped between the on-edge center portion 9 and the two lateral legs 10', 10"; additionally, they are preferably secured in position, or can be held by adhesives, deformation, e.g. ribbing or embossing, staples or the like.

The legs 12 are attached to the frame 1 by adhesives, staples or the like. A mutual spacing is left between neighboring ribs 6. This spacing can be predetermined, for example, by inserting loose spacers between the legs 12 of adjacent ribs 6, or between adjacent legs 10', and 10" of the ribs 6, and connected to the front portion of frame 1, for example by adhesives; alternatively, the legs of the flaps 12' can be so selected that the resulting extension legs 12 will butt against each other when assembled on the frame, to predetermine a selected distance of the ribs, and thus determine the extent of spread of the V-shaped filter pockets.

Figure 2:
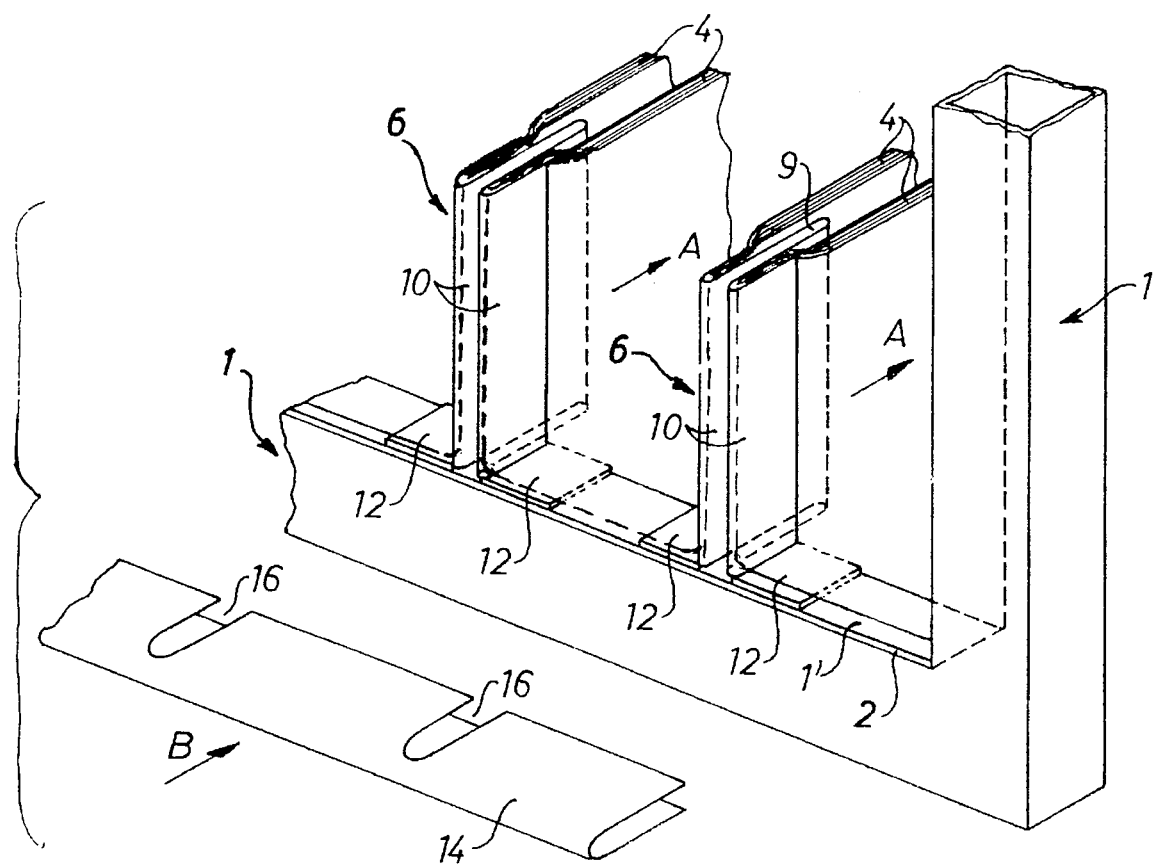
FIG. 2 is a schematic, partly exploded perspective view of a portion of the frame together with attachment elements, and fragments of the filter bags.

FIG. 2 illustrates another embodiment to maintain a predetermined spacing of the rib 6. A comb structure 14, bent in U-shape, is formed with slits 16 which predetermine the spacing between ribs 6. The comb 16 is inserted in direction of the arrow B (FIG. 2) over the legs 12; the ribs 6 engage into the slits 16. The unslit bottom side of the comb 15 then engages the inside of the frame 1. The comb 14 can be connected to the frame 1 by adhesives, or staples. By preselecting the spacing of the slits 16, the spacing of the pockets 4 can be easily matched to predetermined sizes of the frame, considering the numbers of pockets to be placed therein, without requiring any time-consuming resetting of automatic production machinery. It is, of course, also possible to insert the comb 14 in flat form, that is, the side having the slits 16 and then bent into U-shape; or, as illustrated in FIG. 1, applied flat on the frame and then bent over the ribs 6.

Figure 8:
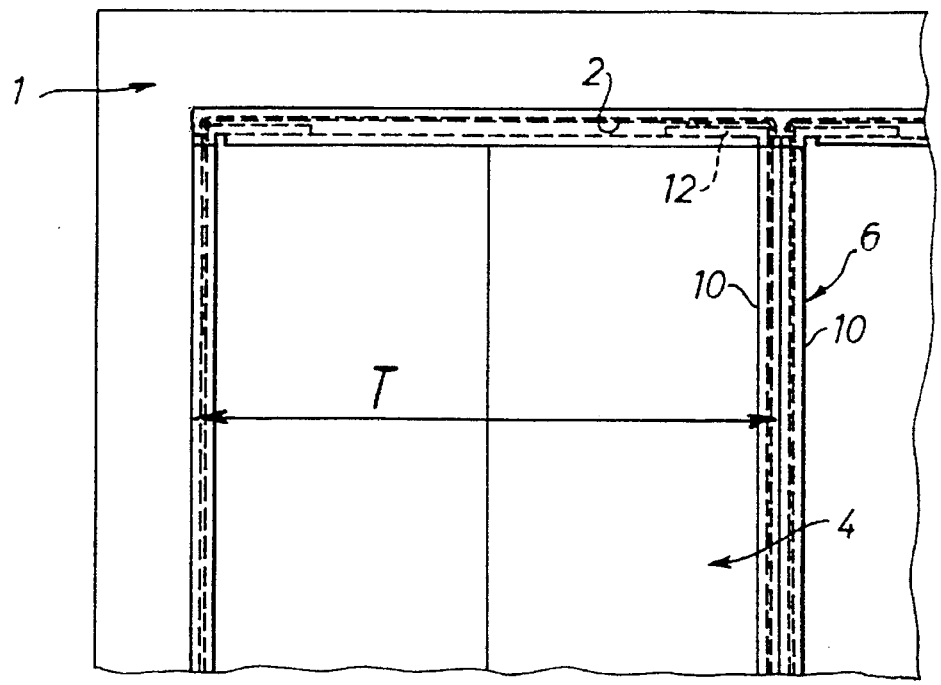
FIG. 8 is a fragmentary view of a holding frame, showing a corner, together with a filter bag and a holding rib.

FIG. 8 illustrates folding of the pockets 4 around the edges, and extending also over the narrow sides of the pockets, not visible in FIG. 1. This permits complete sealing of contaminated air from cleaned air. The width of the pockets is shown at T in FIG. 8, and corresponds to the spacing of respective filter pockets.

Figure 3:
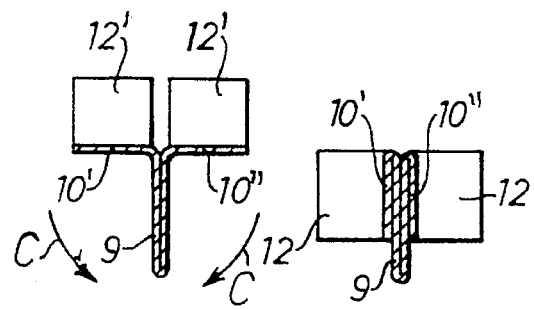
FIG. 3 is a top view of a holding rib for the filter bags before folding.
Figure 5:
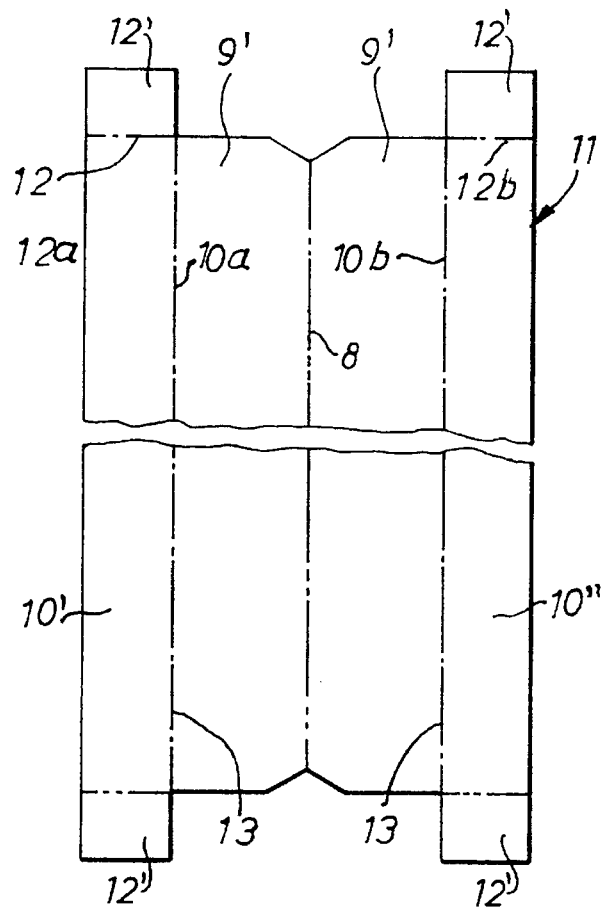
FIG. 5 is a top view of the rib of FIG. 3 after a first folding operation.
Figure 9:
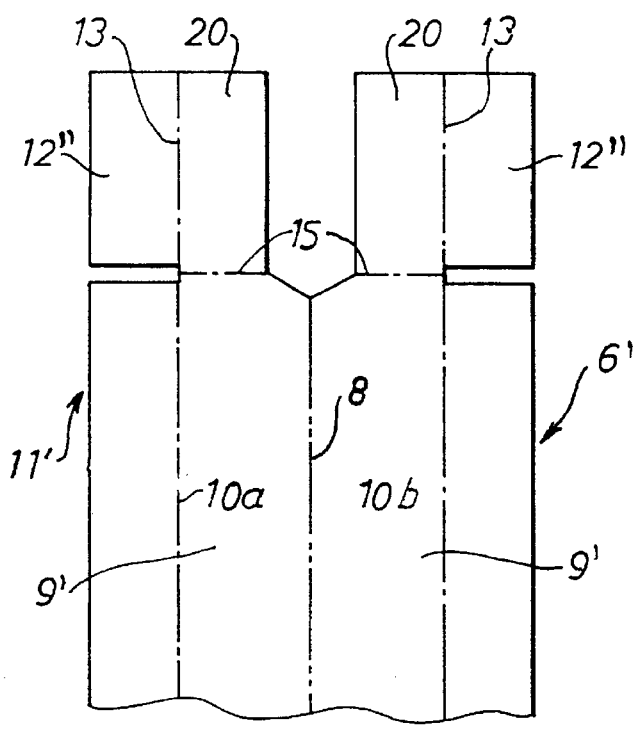
FIG. 9 is a schematic top view of another embodiment of a holding rib, flat, and before folding.
Figure 10:
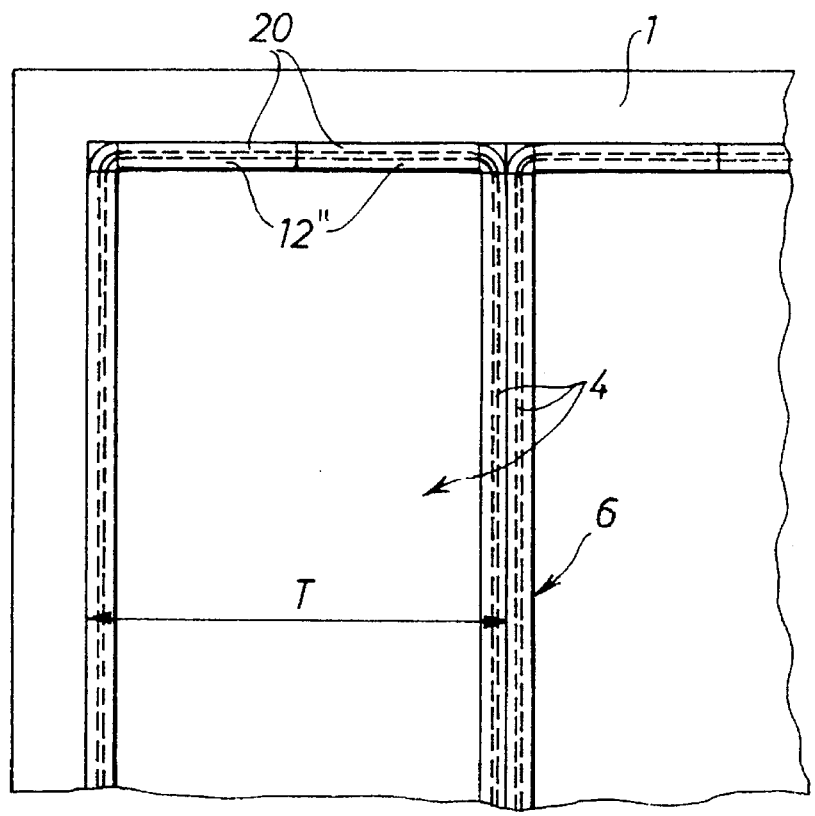
FIG. 10 is a fragmentary top view of the frame with the folding rib of FIG. 9.

FIG. 9 illustrates another embodiment of a blank. The blank 11' is shown flat, similar to FIG. 3. Rather than having the simple flaps 12' as shown in FIG. 3, the embodiment of FIG. 9 illustrates double-wall flaps 12", 20. These double-wall flaps are made by folding both about the fold or crease lines 13 and the fold or crease lines 15. In this arrangement, the material of the filter pockets 4 is clamped between the flaps 12" and 20 and, thus, can be continuously carried around corners. In the finished folded condition, see FIG. 10, the filter material 4 is surrounded by the legs 12', 20 also at the narrow side of the filter, and thus fills the spacing between two ribs 6.

The length of the flaps 12", 20 is preferably so selected that adjacent legs formed by the respective flaps butt against each other, and thus determine the spacing between adjacent, or neighboring filter pockets 4.

The filter pockets 4 can be made of any suitable material, for example fiberglass, plastic, or a paper material, such as a paper, fibrous web, or card web. The respective filter pockets 4 are closed at the end remote from the rib 6, either as a continuous structure or, if made of separate elements, by sewing, adhesion, or welding, as applicable in accordance with the material used.

Figure 11:
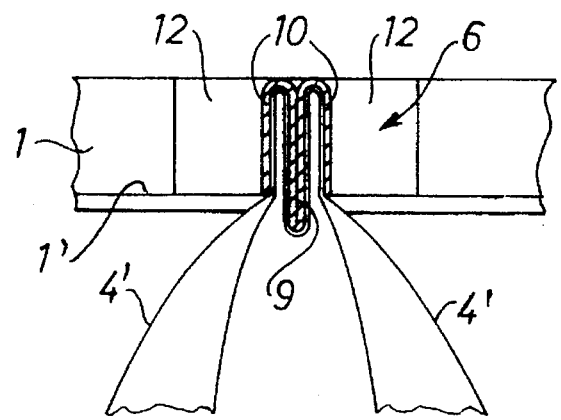
FIG. 11 is a cross section through a folding rib with gas-permeable material installed therein from a continuous material supply, for example a material supply roll.

The rib structure has the additional advantage that it permits automated manufacture from a continuously supplied web of filter material, without making any cuts. A roll of filter material can be supplied directly to a rib forming and folding station to be folded together into the zig-zag rib structure 6 as it is being folded itself. FIG. 11 illustrates portions of a continuous web 4' folded into the lateral portions 10 of the rib 6, and wrapping around the center portion 9. The web, where clamped, will be of double-ply configuration. Lateral closing of the pockets then can be carried out in a subsequent production step, for example by adhesion, sewing, plastic welding, or the like.

In a preferred form, the frame 1 as well as the ribs 9 are made of hard cardboard or other cardboard-like combustible material. Connection of the filter bags and the various elements, ribs, frames and the like is then preferably done by adhesives. Filters of this type, when full, can then be incinerated as a whole, without requiring prior removal of any metallic or plastic materials. If staples are used, they can be easily separated from the resulting ash in accordance with well-known and suitable procedures.

The frame 1 may, for example, be, and preferably is, of the type described in application Ser. No. 08/394,636, filed Feb. 27, 1995, is issued as Pat. No. 5,505,755 by the inventor hereof.

Various changes and modifications may be made and any features described herein may be used with any of the others, within the scope of the inventive concept.

I claim:

1. A filter for a flowing gaseous medium having a frame element (1);

a plurality of adjacently located filter bags (4) of a material which is gas-permeable with respect to said medium, and open to the flow of the gaseous medium; and parallel positioned bag supporting ribs (6) having end portions supported by said frame, wherein, in accordance with the invention, the supporting ribs comprise zig-zag folded rib structures (6), which are folded from a blank (11, 11') in zig-zag form, said folded rib structures including support legs extending at essentially right angles therefrom, and supported on the frame element (1), and wherein the gas-permeable material of said bags of adjacent filter pockets (4) is retained between the folds (9, 10'; 9, 10"; 9, 10) of the zig-zag folded rib structures (6).

2. The filter of claim 1, wherein said support legs (12) and rib structures (6) form a unitary structure of a single material element.

3. The filter of claim 1, wherein each of the rib structures (6) is formed from a single unitary blank (11, 11') of cardboard.

4. The filter of claim 1, wherein the length of said support legs is selected to determine the mutual spacing of said filter bags from each other in the filter.

5. The filter of claim 1, wherein the support legs are double-wall legs (12", 20), and wherein parts of said gas-permeable material are retained between the double-wall legs (12", 20).

6. The filter of claim 1, further including a spacing comb (14) having slits (16) formed therein, spaced from each other by a distance determining the spacing of neighboring, or adjacent bags (4), said spacing comb (14) being engaged against the frame (1), and receiving the rib structures in the slits.

7. The filter of claim 1, wherein each of the rib structures defines a central folded portion (9), and two adjacent lateral folded portions (10', 10", 10); and wherein, in cross-section, the central portion (9) is longer than the lateral portions (10', 10", 10).

8. The filter of claim 1, wherein the frame (1) comprises a non-metallic material, optionally cardboard.

9. The filter of claim 1, wherein the filter bags comprise a continuous web (4') looped between a plurality of rib structures (6), the continuous web of material being guided around the folds of the zig-zag folded rib structure.

10. The filter of claim 9, wherein the rib structure defines a central folded portion (9), and two adjacent lateral folded portions (10', 10", 10); and wherein the continuous web is looped around the central portion (9) and clamped between the lateral portions (10).

11. A method to make a filter assembly comprising the steps of providing a frame element (1);

providing a plurality of filter bags or pockets (4) of a gas-permeable material;

providing supporting rib blanks (9);

forming, on said supporting blanks, a central fold line (8) and, spaced therefrom, two lateral fold lines (10a, 10b) to define a central portion (9', 9") and outer portions (10', 10"), and outer projecting flaps (12') connected to the lateral portions by outer fold lines (12a, 12b);

subsequently folding the blank about the fold lines in zig-zag fashion and simultaneously inserting end portions of the pockets in the blank, as it is being folded, between the outer portions (10', 10") and the adjacent central portions (9', 9") as the blank is being folded about the center fold line (8) and the lateral fold lines (10a, 10b);

securing the end portions of the pockets or bags in clamped position;

changing, in the folding step, the orientation of the projecting flaps (12) by folding about the outer fold lines (12a, 12b) to be essentially perpendicular to the orientation of the zig-zag folded blank (9); and securing the so re-oriented flaps (12'), forming attachment legs (12), on the frame element (1').

12. The method of claim 11, wherein the filter bag is supplied as a continuous web of filter bag material;

and said step of clamping the end portions of the filter bag comprises pre-folding the blank (9) about the center fold line;

feeding the web to the pre-folded blank, and looping the web about the center portion of the pre-folded blank; and then closing the outer portions (10', 10", ) about the lateral fold lines (10a, 10b) against the continuous web, whereby the continuous web will be double-ply and clamped between the lateral portions (10', 10") and the folded central portion (9', 9").

13. The method of claim 11, wherein said step of securing the pockets comprises at least one of: adhesion, sewing, plastic welding, deformation, embossing, stapling.

14. The method of claim 11, including the step of determining spacing between adjacent pockets by dimensioning said flaps (12), or spacer portions thereof or of spacers, to abut against each other when re-oriented against the frame element (1).

* * * * *